INVENTOR.
HARRY L. WHEELER JR.
BY
*William N. Antonis*
ATTORNEY

April 13, 1965   H. L. WHEELER, JR   3,178,023
SELF CLEANING FILTER
Filed Aug. 6, 1962   4 Sheets-Sheet 2
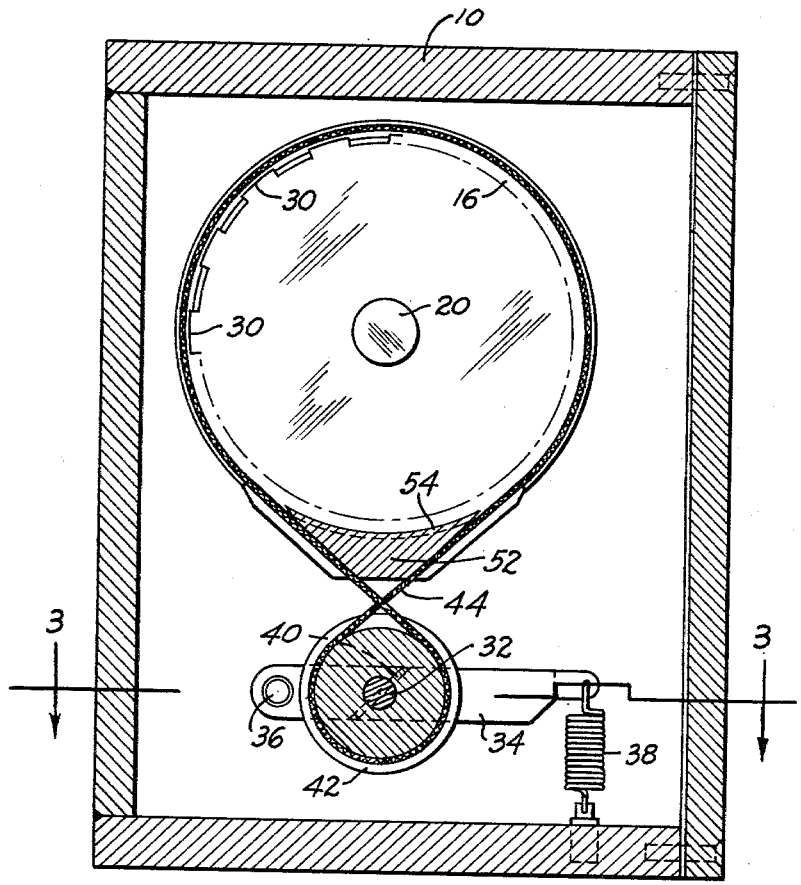
FIG_2
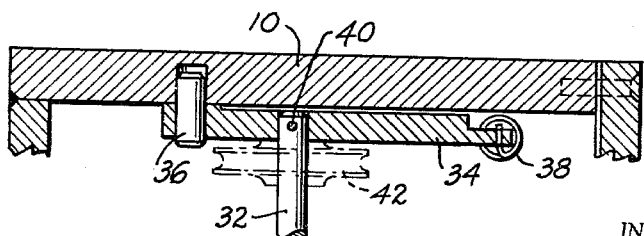
FIG_3
INVENTOR.
HARRY L. WHEELER JR.
BY
William N. Antonis
ATTORNEY.

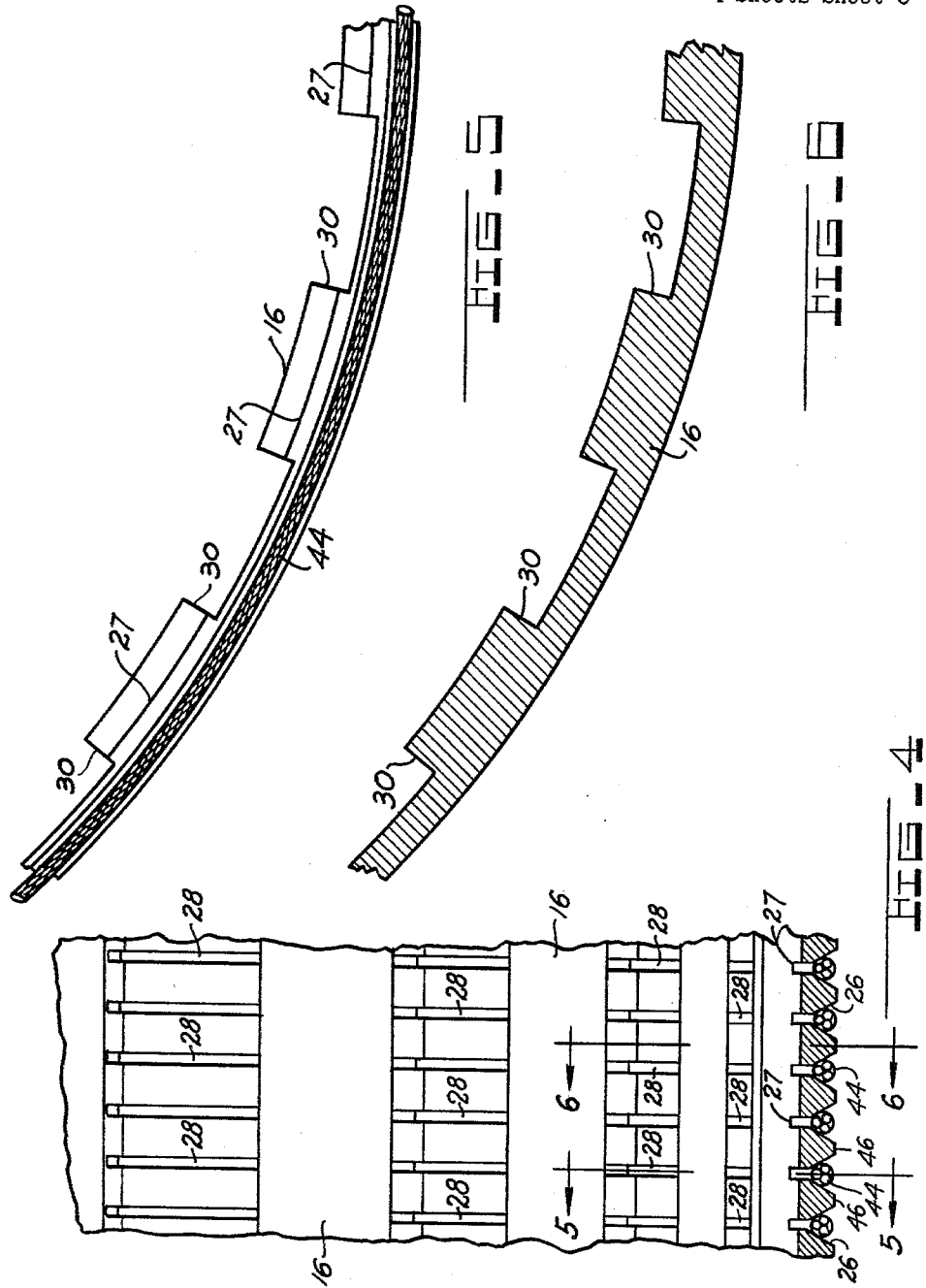

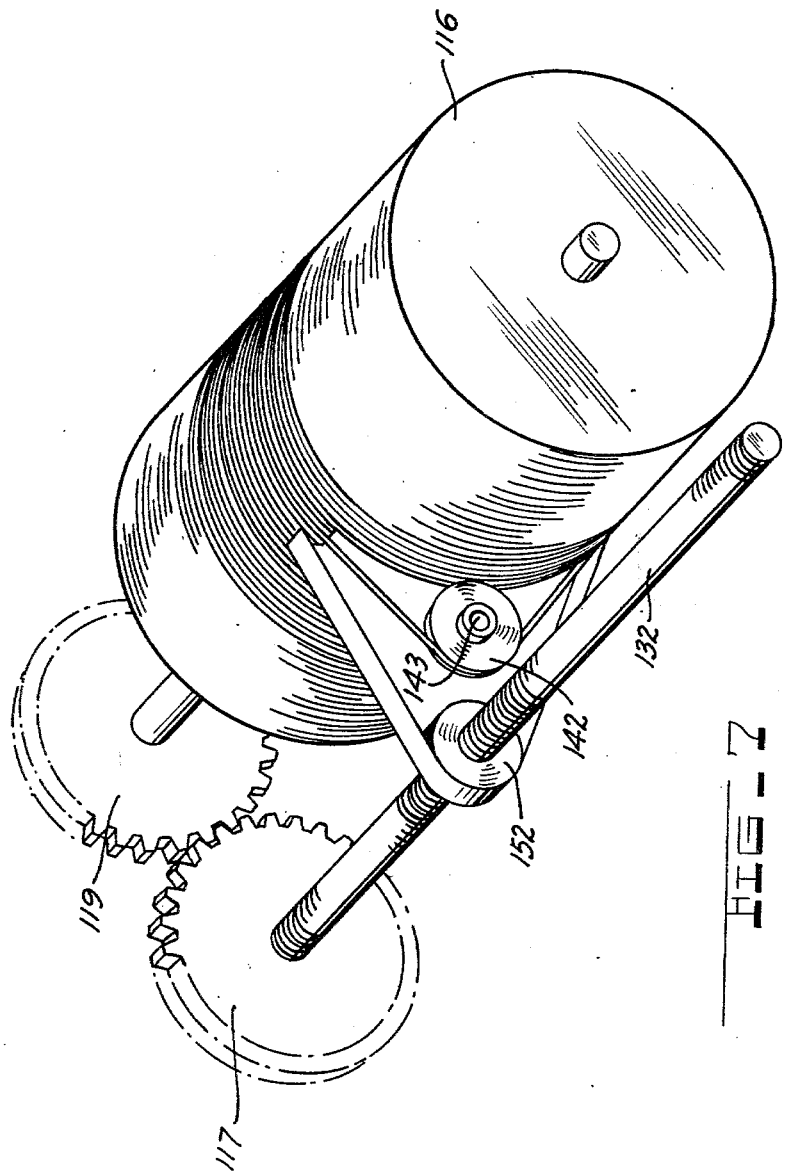

United States Patent Office 3,178,023
Patented Apr. 13, 1965

3,178,023
SELF CLEANING FILTER
Harry L. Wheeler, Jr., Madison Heights, Mich., assignor to The Bendix Corporation, Madison Heights, Mich., a corporation of Delaware
Filed Aug. 6, 1962, Ser. No. 215,153
9 Claims. (Cl. 210—143)

This invention relates to fluid filters and more particularly to a self cleaning wire wrapped fluid filter.

At the present time, the only self cleaning filters, which are known to be commercially available, consist of a stack of metal plates between which are provided a series of rotating scrapers very much like the alternate rotor and stator plates of a variable condenser. Such filters have several inherent disadvantages. In the first place, the degree of filtration which can be achieved is limited by the thickness of metal in the rotating scrapers which thickness is in turn dictated by structural stiffness considerations. Secondly, since the extracted contamination in this type of filter must drip down the side of the filter, the natural flow of fluid into the filter from outside-in will cause this contamination which has just been removed to be driven back into the filter. Thirdly, the scraper type of filter tends to drive contamination into the space between the plates, or to pulverize it.

Accordingly, it is an object of this invention to provide a self cleaning fluid filter which does not possess the above mentioned inherent disadvantages.

Another object of this invention is to provide a self cleaning fluid filter which utilizes a movable stranded wire as part of a filtering surface wherein contaminants which adhere to said wire are carried by said wire away from the surface at which filtration is occurring before the contaminants are wiped from the wire into a sump.

More specifically, it is an object of this invention to provide a self cleaning wire wrapped fluid filter which includes a rotating perforated and threaded cylindrical drum having its perforations located at the root of the thread formed thereon, a stranded wire which is wrapped around the drum and is located between adjacent crests of the thread, an idler pulley arranged so that the stranded wire will pass off the drum, around the pulley and back onto the drum, and a mechanism located between the drum and pulley which scrapes accumulated contamination from the stranded wire. In this arrangement, filtration is accomplished when the fluid passes through the interstices formed between the wire and the sides of the thread and thence through the perforations of the drum.

Another object of this invention is to provide a novel shelf cleaning wire wrapped fluid filter which has a relatively high filtration efficiency and is relatively inexpensive to fabricate.

A further object of this invention is to provide a self cleaning wire wrapped fluid filter of the type described in which the stranded wire is in contact with a single rotating drum at all points except that at which it is removed from the drum for cleaning.

A still further object of this invention is to provide a self cleaning wire wrapped fluid filter of the type described in which the stranded wire does not move relative to the drum, except at the point where it is removed from and rewound on the drum. As a result, there is no relative movement of parts at the effective filtering surface and the pores are clearly defined and nonvariable.

Another object of this invention is to provide a novel porous filtering surface whose porosity is determined by a stranded wire lying in a helical groove formed on the surface of a cylindrical drum which has perforations extending therethrough and located at predetermined intervals along the root of the helical groove.

A further object of this invention is to provide a fluid filter of the type described whose porosity will be relatively uniform and predictable for a given size of thread and stranded wire configuration and whose porosity can be easily increased or decreased simply by changing the size and/or configuration of the stranded wire.

The above and other objects and features of this invention will become apparent from the following description taken in connection with the accompanying drawings which form a part of this disclosure and in which:

FIGURE 2 is a sectional view taken along line 2—2 of FIGURE 1;

FIGURE 3 is a sectional view taken along line 3—3 of FIGURE 2;

FIGURE 4 is an enlarged view of the circumscribed portion of FIGURE 1;

FIGURE 5 is a sectional view taken along line 5—5 of FIGURE 4;

FIGURE 6 is a sectional view taken along line 6—6 of FIGURE 4; and

FIGURE 7 is a schematic perspective view of another embodiment of my invention.

Figure 1:
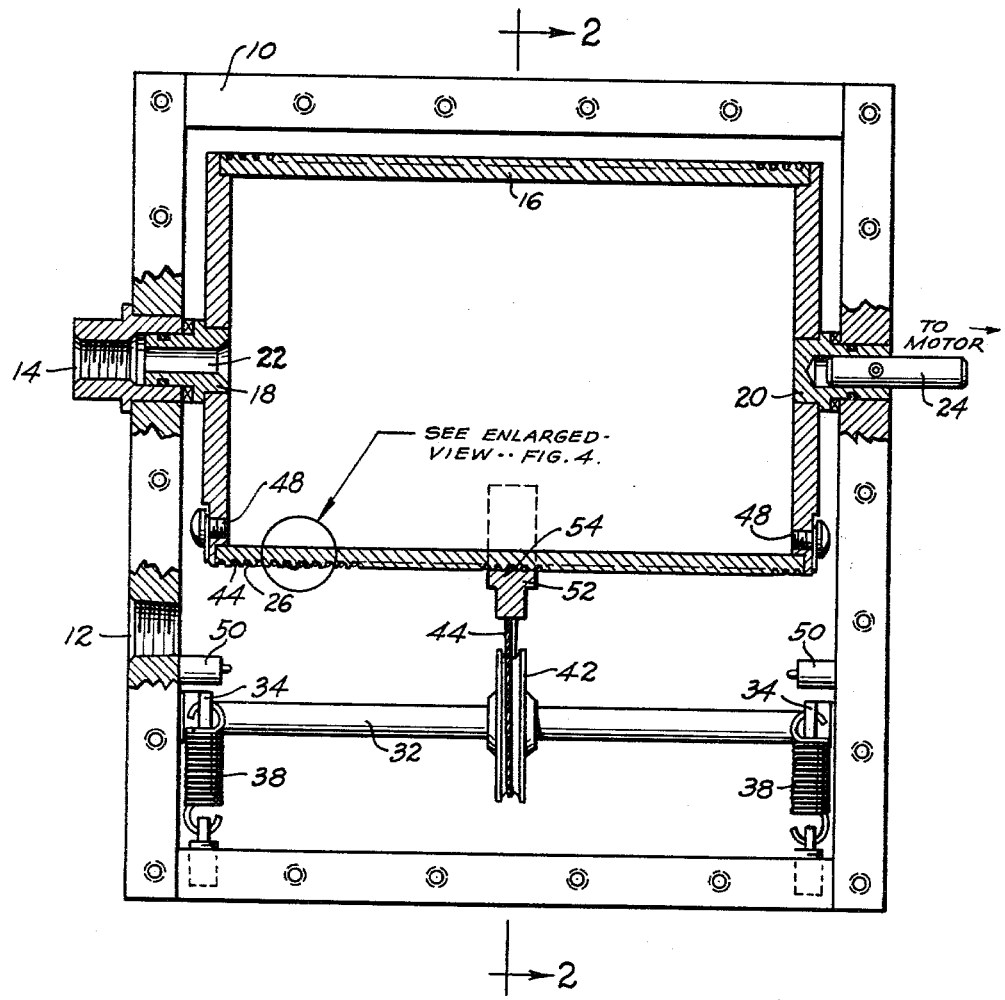
FIGURE 1 is a view partially in section showing a filter unit constructed in accordance with my invention.

Referring to the drawings, it will be noted that numeral 10 indicates a pressure tight box-like housing having an inlet port 12 and an outlet port 14 for permitting flow of fluid therethrough. A hollow cylindrical drum 16 is located within the housing and is operatively connected thereto by a pair of fittings 18 and 20 which permit the drum to be rotated about its axis. One of the fittings 18 includes a passage 22 which communicates the inside of the drum with outlet port 14, while the other fitting is operatively connected to a suitable motor (not shown) through means of a pin 24. The drum may be rotated either by an electric motor or by a hydraulic motor powered by the fluid which is being filtered. Although in the preferred embodiment a motor is used to either continuously or intermittently rotate the drum, it should be understood that under certain conditions the elimination of the motor may be desirable and that the drum could be manually rotated at predetermined intervals. The outer cylindrical surface of the drum is threaded, as shown FIGURE 1 and 4, so that a continuous helical groove or thread 26 extends from one end of the drum to the other. Referring to FIGURES 4, 5 and 6, it will be noted that at predetermined intervals along the root 27 of the thread or helical groove 26 are located a plurality of substantially rectangular drum ports 28 which are formed by broaching a series of axial grooves 30 along the inner surface of the drum so that the axial grooves intersect the minor diameter of the threads. If desired, the same effect could be achieved by other means such as: by forming the drum, helical groove, and the drum ports through means of a casting process, or by wrapping a perforated cylinder with a solid wire which is helically wound therearound and spaced to form effectively a helical groove between the convolutions of solid wire.

Radially spaced from the drum 16 and parallel to the axis thereof is an idler shaft 32 which is operatively connected to the housing 10 by a pair of idler arms 34 each of which has one end pivotally connected to the housing by a pin 36 and the other end arranged to receive a tension spring 38 for a reason to be subsequently explained. The idler shaft 32 is pinned to the idler arms 34 at a point 40 intermediate the ends of said arms. An idler pulley 42 which is located on idler shaft 32 is free to rotate and move from one end of the shaft to the other end of the shaft.

A single stranded or cable-like wire 44, preferably of the helically stranded type, is wrapped around the drum 16 so that it is located between the crests 46 of the thread or in other words in the helical groove 26. This wire is continuously wrapped around the drum except for a portion thereof which passes around pulley 42, as shown in FIGURES 1 and 2. It should be noted that the ends of the stranded wire are fixedly connected to the drum by suitable means such as screws 48. Filtration occurs by passing fluid from outside the drum to inside the drum via the interstices formed between the stranded wire and the sides of the helical groove 26, and the drum ports 28. The degree of filtration is controlled entirely by the number of strands in the stranded wire, by the size of the individual strands, and by the number of twists per linear inch of the stranded wire. The threading on the exterior of the drum is such that with the strand size selected, the stranded wire rests firmly against the sides of the helial groove. The rectangular drum ports 28 are cut so that they do not intersect the sides of the helical groove 26 above the line of contact between the strand wire and the sides of the helical groove.

The strand wire used in connection with the invention may be composed of two or more strands which preferably are helically twisted to in effect form helically disposed protuberances on the surface of the stranded wire. The effective diameter of the wire will be determined by the size and number of strands used, and will be equal to the diameter of the smallest circle circumscribing all of the strands in the wire. Groupings of three or seven strands are most satisfactory because they produce the highest density packing and the most predictable pore sizes. The more predictable pore sizes are due to the fact that the cross-section for a given helically twisted three stranded or seven stranded wire is identical at any point, and the centers of the strands define an equilateral polygon, e.g. in the case of a three stranded wire an equilateral triangle and in the case of a seven stranded wire an equilateral hexagon, since the seventh strand simply serves as a core for the other six strands.

Rotation of the drum 16 about its axis will cause the stranded wire 44 to progressively leave the drum and pass along the pulley 42 before returning to the drum. With the ends of the stranded wire fixed to the drum, virtually all of the stranded wire, which is used as part of the effective filtering surface on the drum, passes around the pulley, thereby causing the pulley to move from one end of the idler shaft 32 to the other. When the idler pulley has reached the end of its travel it will contact either a limit switch or a valve push rod 50 which will reverse the direction of the drive of the motor. The drum will then reverse its direction of rotation and the pulley will return to the opposite end of the idler shaft where a similar limit switch is located. Other methods of reversing the motor may be used. For example, a pre-set counter may be utilized which will allow the motor to make a given number of turns in one direction then cause it to automatically reverse and make an equal number of turns in the opposite direction. Another method of accomplishing reversal would be to utilize a simple type of gear shift such as is used on lathes to reverse the direction of carriage travel.

In order to provide a self cleaning action a wiper shield 52 is located between the drum 16 and pulley 42 in the triangle formed by the intersecting stranded wire 44. This shield is arranged so that it will guide the wire from the drum to the idler pulley and will scrape and/or wipe from the wire any contaminants which have adhered thereto through use of suitable means, such as plastic pads, small brushes, felt pads, or the like, which are attached to the shield. Since the stranded wire that is removed from the drum to pass over the idler pulley will leave behind it exposed drum ports 28 which will have no filtering effect, the center portion of the wiper shield 52 which rests against the drum is raised to form a ridge or male thread 54 which mates with that portion of the helical groove which is not covered by the stranded wire.

In addition, since the wiper shield is sufficiently wide to cover at least three of the threads, as shown in FIG. 1, the abutments to this male thread on the shield edge will rest on the two wraps of stranded wire which are adjacent to the empty drum thread or on the adjacent crests of the thread, depending on which is the highest. Consequently, as the drum rotates, the wiper shield will move along with the wire leaving the drum, said wiper shield being driven forward by the action of the female thread formed on the drum against the male thread formed on the wiper shield, and by the movement of the wire itself. In addition to the driving aspects of the central guiding ridge 54 of the wiper shield, the ridge serves to wipe clear any contamination which may have lodged in the root of the thread. In order to facilitate the cleaning of the wiper shield, if desired, the filter inlet could be arranged so that the wiper shield is constantly being washed by fresh fluid. The stranded wire is maintained under tension through means of tension springs 38 which are attached to idler arms 34.

In the event that a change in the degree of filtration is required, or in the event that the stranded wire becomes worn, the only element that need be replaced is the stranded wire itself. Since the normal mounting of the filter is such that the idler shaft is below the drum and the sludge which is removed from the stranded wire will fall into the sump below the idler shaft, the sump could be provided with a device (not shown), such as an Archimedes' screw with suitable pressure locks, for removing such sludge.

Those acquainted with this art will readily understand that the invention herein set forth is not necessarily limited to the precise and exact details presented and that various changes and modifications may be resorted to without departing from the spirit of the invention. For example it will be noted from the schematic view shown in FIGURE 7, wherein like parts are designated by the same number plus 100 added thereto, that the idler shaft 132 could be threaded to the wiper shield 152 and gear driven from the drum 116 through gears 117 and 119 so that movement of the wiper shield is positive at all times. The idler pulley 142 would then be mounted on the side of the shield rather than on the idler shaft through means on a pin 143. Accordingly, applicant does not desire to be limited to the specific details described herein, primarily for purposes of illustration, but instead desires protection falling within the scope of the appended claims.

Having thus described the various features of the invention, what I claim as new and desire to secure by Letters Patent is:

1. A self cleaning wire wrapped fluid filter comprising a housing having an inlet port and an outlet port for permitting flow of fluid therethrough, a hollow cylindrical drum located within said housing, said drum having a helical thread formed on the outer surface thereof and a plurality of drum ports located at predetermined intervals along the root of said thread, fitting means located at each end of said drum along the axis thereof for operatively connecting said drum to said housing, passage means located in one of said fitting means for communicating the inside of said drum with said outlet port, an idler shaft operatively connected to said housing, said idler shaft being radially spaced from said drum and parallel to the axis thereof, an idler pulley rotatable on said idler shaft and slidable therealong from a first end position to a second end position, a stranded wire wrapped around said drum and located between adjacent crests of said thread for permitting flow of fluid from outside said drum to inside said drum via the interstices formed between the stranded wire and the sides of said thread, said stranded wire having the major portion thereof continuously wrapped around said drum and the remaining portion thereof spaced therefrom and passing around said pulley, means for fixedly connecting the ends of said stranded wire to said drum, means operatively connected to the other of said fitting means for rotating said drum about its axis and causing said stranded wire to progressively leave the drum and pass along said pulley before returning to said drum, a shield-like wiper member located between said drum and said pulley and between two portions of said stranded wire for guiding said wire to and from said drum and for removing contaminants from the wire as it passes onto and off of said pulley, ridge means formed on said wiper member for continuously mating with a portion of said thread which is not covered by the stranded wire and for removing any contaminants therefrom as said drum rotates, and resilient means operatively connected to said idler shaft for maintaining said stranded wire under tension.

2. A self cleaning wire wrapped fluid filter as defined in claim 1 which includes means for reversing the direction of rotation of said drum when said idler pulley reaches one of its end positions.

3. A self cleaning wire wrapped fluid filter comprising a housing having inlet and outlet ports for permitting flow of fluid therethrough, a hollow cylindrical drum located within said housing and operatively connected thereto along the axis of said drum, said drum having a helical groove formed on the outer surface thereof and a plurality of perforations located at predetermined intervals along said helical groove, passage means for communicating the inside of said drum with said outlet port, an idler shaft radially spaced from said drum and parallel to the axis thereof, an idler pulley rotatable on said shaft and slidable therealong, a stranded wire wrapper around said drum and located in said groove for permitting flow of fluid from outside said drum to inside said drum via the interstices formed between the stranded wire and the sides of said groove, said stranded wire having the major portion thereof continuously wrapped around said drum and the remaining portion thereof spaced therefrom and passing around said pulley, means for fixedly connecting the ends of said stranded wire to said drum, means for rotating said drum about its axis and causing said stranded wire to progressively leave the drum and pass along said pulley before returning to said drum, wiper means located between the drum and the pulley for removing contaminants from the wire as it passes onto and off of said pulley, said wiper means having ridge means formed thereon for mating with a portion of said drum groove not covered by the stranded wire, and means operatively connected to said idler shaft for maintaining said stranded wire under tension.

4. A self cleaning wire wrapped fluid filter comprising a housing having inlet and outlet ports for permitting flow of fluid therethrough, a hollow cylindrical drum located within said housing and operatively connected thereto along the axis of said drum, said drum having a helical groove formed on the outer surface thereof and a plurality of drum ports located at predetermined intervals along said helical groove, passage means for communicating the inside of said drum with said outlet port, a threaded idler shaft radially spaced from said drum and parallel to the axis thereof, a wiper shield threaded onto said idler shaft, an idler pulley pinned to said shield, said pulley being rotatable about said pin, a stranded wire wrapped around said drum and located in said groove for permitting flow of fluid from outside said drum to inside said drum via the interstices formed between the stranded wire and the sides of said groove, said stranded wire having the major portion thereof continuously wrapped around said drum and the remaining portion thereof spaced therefrom and passing around said pulley, means for fixedly connecting the ends of said stranded wire to said drum, means for rotating said drum about its axis and causing said stranded wire to progressively leave the drum and pass along said pulley before returning to said drum, said last named means being operatively connected to said idler shaft to cause rotation thereof and consequent movement of the wiper shield and pulley axially with respect to said drum as said stranded wire passes along said pulley, and wiper means located on said shield for removing contaminants from the wire as it passes onto and off of said pulley.

5. A self cleaning wire wrapped fluid filter as defined in claim 4 wherein said means for rotating said drum and idler shaft includes a pair of meshing gears one of which is operatively connected to said drum and the other of which is operatively connected to said idler shaft.

6. A self cleaning wire wrapped fluid filter comprising a housing having inlet and outlet ports for permitting flow of fluid therethrough, a hollow cylindrical drum located within said housing and operatively connected thereto along the axis of said drum, said drum having a helical groove formed on the outer surface thereof and a plurality of drum ports located at predetermined intervals along said helical groove, pulley means operatively connected to said housing, a stranded wire wrapped around said drum and located in said groove for permitting flow of fluid from outside said drum to inside said drum via the interstices formed between the stranded wire and the sides of said groove, said stranded wire having the major portion thereof continuously wrapped around said drum and the remaining portion thereof spaced therefrom and passing around said pulley means, means for fixedly connecting the ends of said stranded wire to said drum, means for rotating said drum about its axis and causing said stranded wire to progressively leave the drum and pass along said pulley means before returning to said drum, wiper means for removing contaminants from said stranded wire as it passes onto and off of said pulley, and means for maintaining said stranded wire under tension.

7. A self cleaning wire wrapped fluid filter comprising a rotatable hollow cylindrical drum having a helical groove formed on the outer surface thereof, said drum having a plurality of ports located therein at predetermined intervals along the root of said helical groove, a stranded wire having each end thereof fixedly connected to said drum, said wire being wrapped around said drum and located in said groove for permitting flow of fluid from outside said drum to inside said drum via the interstices formed between the stranded wire and the sides of said groove, means for maintaining said wire under tension and for progressively permitting a portion of same to leave said groove and return thereto as said drum rotates, and means for removing contaminants from that portion of the stranded wire which has left said groove and that portion of said groove which is not covered by said stranded wire.

8. A self cleaning wire wrapped fluid filter comprising a rotatable hollow cylindrical drum having a helical groove formed on the outer surface thereof, said drum having a plurality of ports located therein at predetermined intervals along the root of said helical groove, a stranded wire wrapped around said drum and located in said groove for permitting flow of fluid from outside said drum to inside said drum via the interstices formed between the stranded wire and the sides of said groove, means for progressively permitting a portion of said stranded wire to leave said groove and subsequently return thereto as said drum rotates, and means for removing contaminants from that portion of the stranded wire which has left said groove.

9. A self cleaning wire wrapped fluid filter comprising a rotatable hollow cylindrical drum having a helical thread formed on the outer surface thereof, said drum having a plurality of ports located therein at predetermined intervals along the root of said thread, a wire wrapped around said drum and located between adjacent crests of said thread for permitting flow of fluid from outside said drum to inside said drum via the interstices formed between said wire and the sides of said thread, means for progressively permitting a portion of said wire to leave said thread and subsequently return thereto as said drum rotates, and means for removing contaminants from that portion of the wire which has left the thread and that portion of the thread which is not covered by said wire.

References Cited by the Examiner

UNITED STATES PATENTS

| | | | |
|---|---|---|---|
| 342,038 | 5/86 | Pugh | 242—158.4 X |
| 776,975 | 12/04 | Wheaton | 242—158.4 |
| 1,485,425 | 3/24 | Myette | 242—158.4 |
| 1,880,005 | 9/32 | Wright et al. | 210—401 X |
| 2,247,460 | 7/41 | Wright | 210—410 X |
| 2,820,549 | 1/58 | Belke | 210—497.1 X |

FOREIGN PATENTS

| | | |
|---|---|---|
| 452,344 | 11/48 | Canada. |
| 458,005 | 12/36 | Great Britain. |

GEORGE D. MITCHELL, *Primary Examiner.*

HERBERT L. MARTIN, *Examiner.*